United States Patent [19]

Kolagotla et al.

[11] Patent Number: 5,983,333
[45] Date of Patent: Nov. 9, 1999

[54] HIGH SPEED MODULE ADDRESS GENERATOR

[75] Inventors: Ravi Kumar Kolagotla, Breinigsville; Mohit Kishore Prasad, Bethlehem, both of Pa.

[73] Assignee: Lucent Technologies Inc., Murray Hill, N.J.

[21] Appl. No.: 08/919,054

[22] Filed: Aug. 27, 1997

[51] Int. Cl.⁶ .................................................. G06F 12/00
[52] U.S. Cl. ...................... 711/219; 711/200; 711/220; 711/211
[58] Field of Search .................................... 711/110, 220, 711/217, 219, 200, 211; 395/421.1; 364/200, 746

[56] References Cited

U.S. PATENT DOCUMENTS

| | | | |
|---|---|---|---|
| 4,202,035 | 5/1980 | Lane | 364/200 |
| 4,704,680 | 11/1987 | Saxe | 364/200 |
| 4,800,524 | 1/1989 | Roesgen | 364/900 |
| 4,809,156 | 2/1989 | Taber | 364/200 |
| 4,833,602 | 5/1989 | Levy et al. | 364/900 |
| 4,908,748 | 3/1990 | Pathak et al. | 364/200 |
| 4,935,867 | 6/1990 | Wang et al. | 364/200 |
| 5,276,827 | 1/1994 | Delaruelle et al. | 395/400 |
| 5,381,360 | 1/1995 | Shridhar et al. | 364/746 |
| 5,440,705 | 8/1995 | Wang et al. | 395/421.1 |
| 5,507,027 | 4/1996 | Kawamoto | 395/375 |
| 5,511,017 | 4/1996 | Cohen et al. | 364/746 |
| 5,623,621 | 4/1997 | Garde | 395/421.1 |
| 5,659,700 | 8/1997 | Chen et al. | 395/421.07 |

*Primary Examiner*—Eddie P. Chan
*Assistant Examiner*—Kimberly McLean
*Attorney, Agent, or Firm*—David L. Smith

[57] ABSTRACT

In accordance with the present invention, an address arithmetic unit provides a modulo addressing technique for addressing memory locations in a circular buffer. The address arithmetic unit includes a first selector adapted to receive as a first input a value representative of one greater than an ending address, a second input that is a beginning address, and a select input that is the sign of a displacement for stepping through addresses in a circular buffer. The first selector is adapted to select one of its inputs as an output. A first adder combines an address pointer and displacement to produce a first potential next address pointer. A second adder combines the address pointer, the displacement, and a length modified by the sign of the displacement to produce a second potential next address pointer. A sign detector performs a comparison to determine whether a sum of the address pointer, displacement and a negative representation of the first selector output is greater than or equal to zero, or less than zero, and provides an output. A second selector selects one of the first potential next address pointer or the second potential next address pointer as the next address pointer based on the comparator output.

12 Claims, 3 Drawing Sheets

HIGH SPEED MODULE ADDRESS GENERATOR

TECHNICAL FIELD

This application relates generally to address arithmetic units for microprocessors and digital signal processors, and in particular to specialized circuitry and method for generating modulo addresses.

BACKGROUND OF THE INVENTION

Many applications performed on microprocessors or digital signal processors require the generation of addresses to fetch data from memory. One such application requires the appearance of a circular buffer such that data stored in a contiguous, finite portion of a memory array appears to be endless. The addressing technique used for circular buffers, known as modulo addressing, provides that an address stored in an address pointer will be incremented or decremented by a predetermined displacement for each memory access until a beginning or ending address boundary is reached or exceeded. When a beginning or ending address boundary is reached or exceeded, the address pointer for the next memory access will "wrap around" to the other end of the address range of the finite array.

Software addressing techniques have typically been used to generate modulo addresses in microprocessors. While only a few instruction cycles are required for each modulo address generating operation, in applications requiring intensive modulo address generation, as are often incurred in digital signal processing, a detrimental impact on processor performance occurs. Implementation of modulo addressing in hardware can obviate the detrimental impact on processor performance.

Modulo addressing is achieved in an address arithmetic unit by associating with a memory pointer a first register which stores either a beginning address or an ending address, and a second register which stores either the other of the ending or beginning address, or the length of the circular buffer being defined. As an example of modulo addressing, the first register may be set with a beginning address and the second register may be set with an ending address to define the address range of the finite array that comprises the circular buffer.

Known modulo addressing techniques are described in U.S. Pat. Nos. 5,623,621, 4,908,748, and 4,800,524. One shortcoming of existing modulo addressing techniques is that they are either complex and slow, or are not true modulo addressing techniques. Present modulo addressing techniques either restrict the increment or decrement displacement value to be one or restrict the size of the number of locations of the circular buffer relative to the displacement value such that the number of locations of the circular buffer is an integral multiple of the displacement value. This limitation is to assure that when memory locations in the circular buffer are addressed, and the address pointer is post incremented or post decremented in preparation for accessing a subsequent address in the circular buffer, the beginning address or ending address will not be bypassed or skipped-over. Restricting the increment or decrement displacement value to be one, assures that eventually the address pointer will take on the beginning address or the ending address generated as a result of the post increment or post decrement operation, and that a comparison to the address stored in the beginning, address register or ending address register will result in a match that will cause the address generator to "wrap around" to the other end of the array.

What is needed is a true modulo addressing technique that accommodates any displacement value, buffer size and location, while using simple hardware that does not limit the speed of operation of a digital signal processor employing the technique.

SUMMARY OF THE INVENTION

In accordance with the present invention, an address arithmetic unit provides a modulo addressing technique for addressing memory locations in a circular buffer. The address arithmetic unit includes a first selector adapted to receive as a first input a value representative of one greater than an ending address, a second input that is a beginning address, and a select input that is the sign of a displacement for stepping through addresses in a circular buffer. The first selector is adapted to select one of its inputs as an output. A first adder combines an address pointer and displacement to produce a first potential next address pointer. A second adder combines the address pointer, the displacement, and a length modified by the sign of the displacement to produce a second potential next address pointer. A sign detector performs a comparison to determine whether a sum of the address pointer, displacement and a negative representation of the first selector output is greater than or equal to zero, or less than zero, and provides an output. A second selector selects one of the first potential next address pointer or the second potential next address pointer as the next address pointer based on the comparator output.

DETAILED DESCRIPTION

Figure 1:
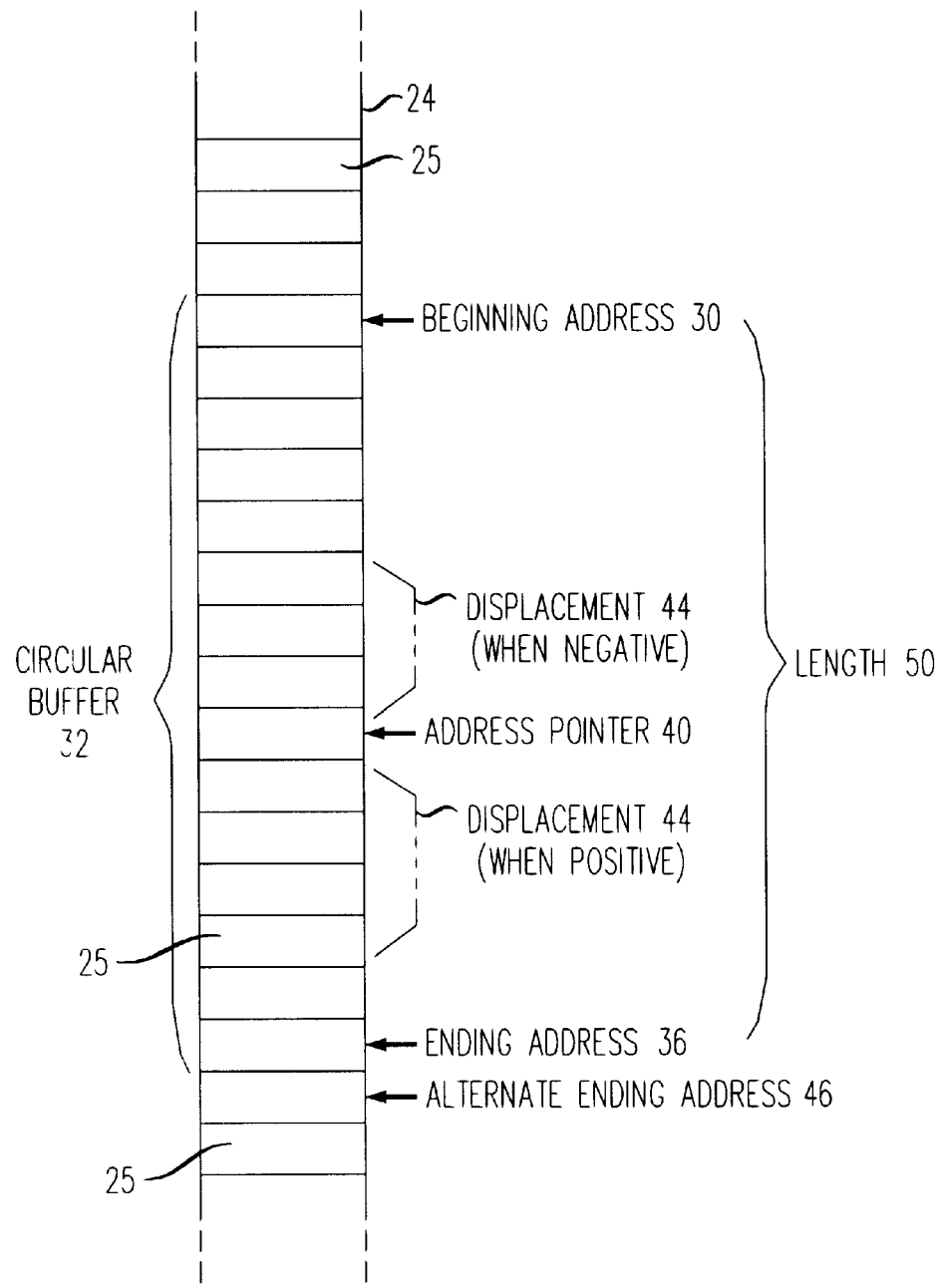
FIG. 1 is a portion of a memory array, including a circular buffer defined by a beginning address and an ending address, an address pointer, and a displacement having either a positive or negative displacement.

The address management system of the present invention may be used to generate modulo addresses, such as in a microprocessor, microcontroller, or digital signal processor. FIG. 1 illustrates a portion of a memory array 24 having individually addressable memory locations or registers 25 in an integrated circuit 26. Also shown are beginning address 30 which defines the address of the initial memory location in memory array 24 where circular buffer 32 begins and an ending address 36 which defines the address of the last memory location in memory array 24 where circular buffer 32 ends. The beginning address 30 and ending address 36 thus define the address boundaries of circular buffer 32. Also shown is an alternate ending address 46 which will be discussed below. Address pointer 40 retains the address of the memory location or register of circular buffer 32 that will be accessed next. Displacement 44 can be either positive, typically but not limited to indicating an increment, or negative, typically but not limited to indicating a decrement. The displacement is used to step through addresses of circular buffer 32 in a selective manner that is user defined. Typically the displacement is a fixed value, but the invention is not limited thereto.

Given a displacement 44, that is either an increment or decrement, circular buffer 32 is addressed typically starting at beginning address 30 stored in beginning address register 28 for increments, and typically starting at ending address 36 for decrements. After each memory location access is initiated, a new address for use in a subsequent memory access is generated and compared to the address stored in one of beginning address register 28 or ending address register 34. The comparison to the beginning address or ending address is to determine if an address boundary has been reached or exceeded such that address pointer 40 for the next memory access should "wrap around" to the other address boundary in circular buffer 32.

Knowing the beginning address and ending address of a circular buffer 32, as well as the present address pointer and displacement, the right side of equations (1) through (4) represent operations to be performed to generate the address pointer, shown on the left side of equations (1) through (4), for a subsequent memory access. When displacement is positive, equations (1) and (2) are used; when displacement is negative, equations (3) and (4) are used.

$$\begin{pmatrix}\text{address}\\\text{pointer}\end{pmatrix} = \tag{1}$$

$$\begin{pmatrix}\text{address}\\\text{pointer}\end{pmatrix} + \text{displacement if } \begin{pmatrix}\text{address}\\\text{pointer}\end{pmatrix} + \text{displacement} \le \begin{pmatrix}\text{ending}\\\text{address}\end{pmatrix}$$

$$\begin{pmatrix}\text{address}\\\text{pointer}\end{pmatrix} = \begin{pmatrix}\text{address}\\\text{pointer}\end{pmatrix} + \text{displacement} - \begin{pmatrix}\text{ending}\\\text{address}\end{pmatrix} - 1 + \tag{2}$$

$$\begin{pmatrix}\text{beginning}\\\text{address}\end{pmatrix} \text{ if } \begin{pmatrix}\text{address}\\\text{pointer}\end{pmatrix} + \text{displacement} > \begin{pmatrix}\text{ending}\\\text{address}\end{pmatrix}$$

$$\begin{pmatrix}\text{address}\\\text{pointer}\end{pmatrix} = \tag{3}$$

$$\begin{pmatrix}\text{address}\\\text{pointer}\end{pmatrix} + \text{displacement} - \begin{pmatrix}\text{beginning}\\\text{address}\end{pmatrix} + \begin{pmatrix}\text{ending}\\\text{address}\end{pmatrix} +$$

$$1 \text{ if } \begin{pmatrix}\text{address}\\\text{pointer}\end{pmatrix} + \text{displacement} < \begin{pmatrix}\text{beginning}\\\text{address}\end{pmatrix}$$

$$\begin{pmatrix}\text{address}\\\text{pointer}\end{pmatrix} = \tag{4}$$

$$\begin{pmatrix}\text{address}\\\text{pointer}\end{pmatrix} + \text{displacement if } \begin{pmatrix}\text{address}\\\text{pointer}\end{pmatrix} + \text{displacement} \ge \begin{pmatrix}\text{beginning}\\\text{address}\end{pmatrix}$$

When one of the beginning and ending addresses of a circular buffer 32 are known, as well as the present address pointer, displacement and length of circular buffer 32, equations (1) through (4) can be written in terms of the known quantities. Analytically, the address computation and address comparison operations share common computations. Advantage can be taken of the common computations to generate modulo addresses more efficiently. For example, when the beginning address is known, equations (1) through (4) can be written as equations (5) through (8). Equations (5) and (6) are used when displacement is positive; equations (7) and (8) are used when displacement is negative.

$$\begin{pmatrix}\text{address}\\\text{pointer}\end{pmatrix} = \begin{pmatrix}\text{address}\\\text{pointer}\end{pmatrix} + \text{displacement if } \begin{pmatrix}\text{address}\\\text{pointer}\end{pmatrix} + \text{displacement} < \tag{5}$$

$$\begin{pmatrix}\text{begining}\\\text{address}\end{pmatrix} + \text{length}$$

$$\begin{pmatrix}\text{address}\\\text{pointer}\end{pmatrix} = \tag{6}$$

$$\begin{pmatrix}\text{address}\\\text{pointer}\end{pmatrix} + \text{displacement} - \text{length if } \begin{pmatrix}\text{address}\\\text{pointer}\end{pmatrix} + \text{displacement} \ge$$

$$\begin{pmatrix}\text{beginning}\\\text{address}\end{pmatrix} + \text{length}$$

$$\begin{pmatrix}\text{address}\\\text{pointer}\end{pmatrix} = \begin{pmatrix}\text{address}\\\text{pointer}\end{pmatrix} + \text{displacement} + \tag{7}$$

$$\text{length if } \begin{pmatrix}\text{address}\\\text{pointer}\end{pmatrix} + \text{displacement} < \begin{pmatrix}\text{beginning}\\\text{address}\end{pmatrix}$$

$$\begin{pmatrix}\text{address}\\\text{pointer}\end{pmatrix} = \tag{8}$$

$$\begin{pmatrix}\text{address}\\\text{pointer}\end{pmatrix} + \text{displacement if } \begin{pmatrix}\text{address}\\\text{pointer}\end{pmatrix} + \text{displacement} \ge$$

$$\begin{pmatrix}\text{beginning}\\\text{address}\end{pmatrix}$$

Defining alternate ending address (written as alternate ending in the equations below) as the address of the first memory location beyond the ending address, alternate ending address=ending address+1, equations (1) through (4) can be rewritten as equations (9) through (12) as follows:

$$\begin{pmatrix}\text{address}\\\text{pointer}\end{pmatrix} = \tag{9}$$

$$\begin{pmatrix}\text{address}\\\text{pointer}\end{pmatrix} + \text{displacement if } \begin{pmatrix}\text{address}\\\text{pointer}\end{pmatrix} + \text{displacement} <$$

$$\begin{pmatrix}\text{alternate}\\\text{ending}\end{pmatrix}$$

$$\begin{pmatrix}\text{address}\\\text{pointer}\end{pmatrix} = \begin{pmatrix}\text{address}\\\text{pointer}\end{pmatrix} + \text{displacement} - \begin{pmatrix}\text{alternate}\\\text{ending}\end{pmatrix} + \tag{10}$$

$$\begin{pmatrix}\text{beginning}\\\text{address}\end{pmatrix} \text{ if } \begin{pmatrix}\text{address}\\\text{pointer}\end{pmatrix} + \text{displacement} \ge \begin{pmatrix}\text{alternate}\\\text{ending}\end{pmatrix}$$

$$\begin{pmatrix}\text{address}\\\text{pointer}\end{pmatrix} = \begin{pmatrix}\text{address}\\\text{pointer}\end{pmatrix} + \text{displacement} - \begin{pmatrix}\text{beginning}\\\text{address}\end{pmatrix} + \tag{11}$$

$$\begin{pmatrix}\text{alternate}\\\text{ending}\end{pmatrix} \text{ if } \begin{pmatrix}\text{address}\\\text{pointer}\end{pmatrix} + \text{displacement} < \begin{pmatrix}\text{beginning}\\\text{address}\end{pmatrix}$$

$$\begin{pmatrix}\text{address}\\\text{pointer}\end{pmatrix} = \tag{12}$$

$$\begin{pmatrix}\text{address}\\\text{pointer}\end{pmatrix} + \text{displacement if } \begin{pmatrix}\text{address}\\\text{pointer}\end{pmatrix} + \text{displacement} \ge$$

$$\begin{pmatrix}\text{beginning}\\\text{address}\end{pmatrix}$$

By defining the length of circular buffer 32 as length= alternate end address−beginning address, equations (9) through (12) may be rewritten as equations (13) through (16).

$$\begin{pmatrix}\text{address}\\\text{pointer}\end{pmatrix} = \begin{pmatrix}\text{address}\\\text{pointer}\end{pmatrix} + \tag{13}$$

$$\text{displacement if } \begin{pmatrix}\text{address}\\\text{pointer}\end{pmatrix} + \text{displacement} - \begin{pmatrix}\text{alternate}\\\text{ending}\end{pmatrix} < 0$$

-continued $$\begin{pmatrix} \text{address} \\ \text{pointer} \end{pmatrix} = \begin{pmatrix} \text{address} \\ \text{pointer} \end{pmatrix} + \text{displacement} - \qquad (14)$$

$$\text{length if} \begin{pmatrix} \text{address} \\ \text{pointer} \end{pmatrix} + \text{displacement} - \begin{pmatrix} \text{alternate} \\ \text{ending} \end{pmatrix} \geq 0$$

$$\begin{pmatrix} \text{address} \\ \text{pointer} \end{pmatrix} = \begin{pmatrix} \text{address} \\ \text{pointer} \end{pmatrix} + \text{displacement} + \qquad (15)$$

$$\text{length if} \begin{pmatrix} \text{address} \\ \text{pointer} \end{pmatrix} + \text{displacement} - \begin{pmatrix} \text{beginning} \\ \text{address} \end{pmatrix} < 0$$

$$\begin{pmatrix} \text{address} \\ \text{pointer} \end{pmatrix} = \begin{pmatrix} \text{address} \\ \text{pointer} \end{pmatrix} + \qquad (16)$$

$$\text{displacement if} \begin{pmatrix} \text{address} \\ \text{pointer} \end{pmatrix} + \text{displacement} - \begin{pmatrix} \text{beginning} \\ \text{address} \end{pmatrix} \geq 0$$

Equations (13) and (14) are employed to generate an updated address pointer when the displacement is positive, and equations (15) and (16) are employed to generate an updated address pointer when the displacement is negative.

Figure 2:
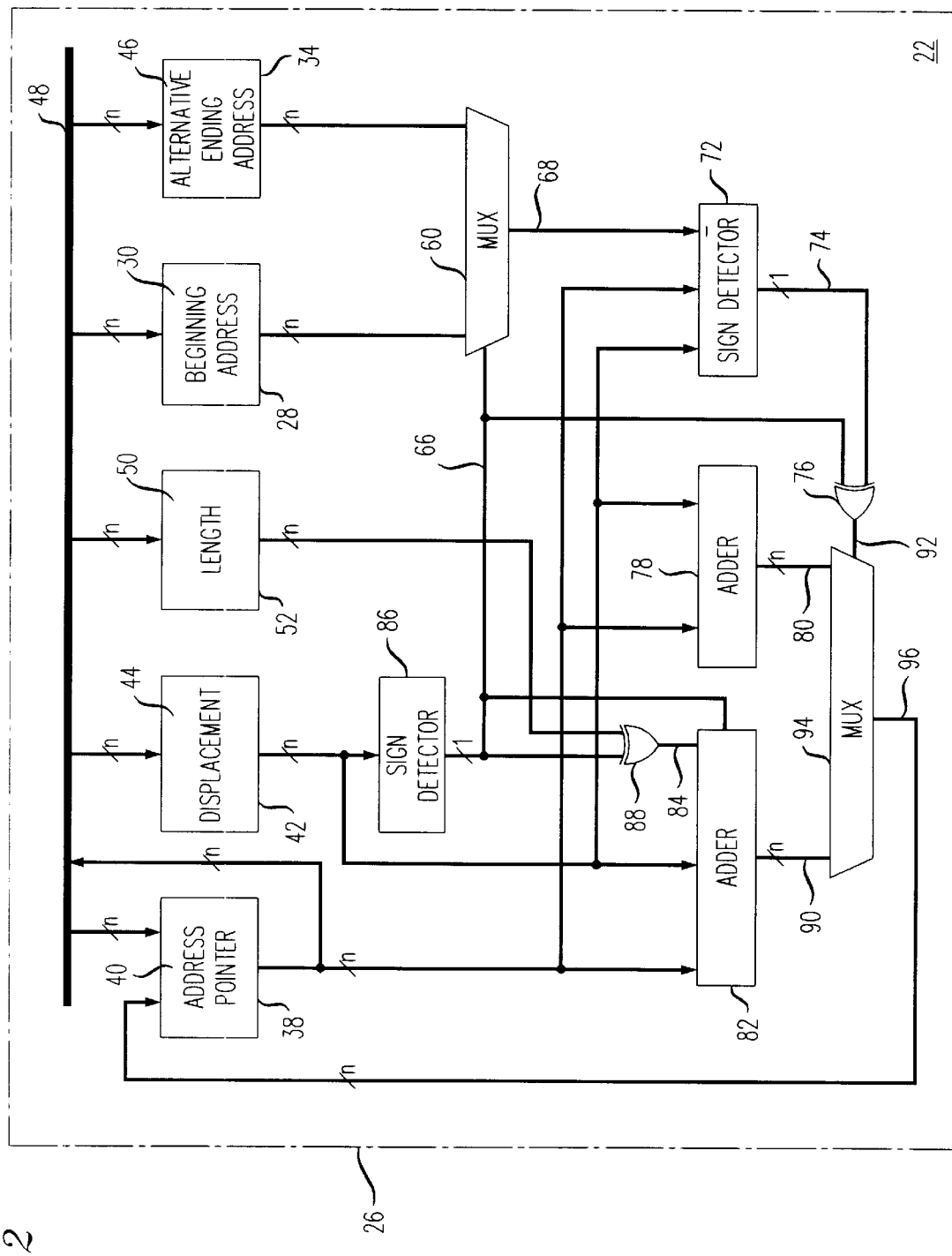
FIG. 2 is a portion of an address arithmetic unit in accordance with an illustrative embodiment of the invention.

FIG. 2 is a circuit illustrating a portion of an address arithmetic unit 22 for generating the address pointer 40 in a processor 26 such as a microprocessor, microcontroller or digital signal processor by modulo addressing, such as a result of incrementing or decrementing the value of address pointer 40. Arithmetic unit 22 implements modulo addressing in accordance with equations (13) through (16). The address pointer 40, displacement 44, and beginning address 30 are loaded from bus 48 into, respectively, address pointer register 38, displacement register 42, and beginning address register 28. In addition, alternate ending address 46 is calculated from ending address 36 and is loaded into alternate ending address register 34 from bus 48, and length 50 is calculated as described above and is loaded into length register 52 from bus 48.

Multiplexer 60 receives as a first input alternate ending address 46 from alternate ending address register 34. Multiplexer 60 receives as a second input beginning address 30 from beginning address register 28. Select input 66 is the sign of displacement 44. When the displacement 44 is positive indicating stepping through addresses of circular buffer 32 such that a subsequent address increments relative to a previous address pointer, alternate ending address 46 is selected as the output 68 of multiplexer 60. When the displacement 44 is negative indicating stepping through address of circular buffer 32 such that a subsequent address pointer decrements relative to a previous address pointer, beginning address 30 is selected as output 68 of multiplexer 60.

Output 68 from multiplexer 60 is a first input to sign detector 72. Sign detector 72 receives two other inputs, the current address pointer 40 from address pointer register 38 and the displacement 44 from displacement register 42. Sign detector 72 combines the three inputs by subtracting output 68 from the sum of address pointer 40 and displacement 44. Sign detector 72 may or may not complete the addition of its inputs but provides a one-bit output 74 that is the sign of the sum of the current address pointer 40, the displacement 44 and a negative of output 60 from multiplexer 60. Output 74 is provided as a first input to exclusive OR gate 76. Sign detector 72 determines whether the combination is greater than or equal to zero, or less than zero.

Adder 78, illustrated as two-input adder, receives as a first input address pointer 40 from address pointer register 38 and receives as a second input displacement 44 from displacement register 42. Adder 78 adds the first and second inputs to produce a first sum output 80 which is the sum of the current address pointer and the displacement. First sum output 80 is a first potential next address pointer.

Adder 82 is illustrated as a three input adder. Adder 82 receives as a first input address pointer 40 from address pointer register 38, as a second input displacement 44 from displacement register 42, and as a third input length 50 from length register 52.

Adder 82 subtracts the length 50 from the sum of the current address pointer and the displacement when the sign bit 66 of displacement 44 takes on a first logic level, such as a logic zero, and adds the length 50 to the sum of the current address pointer and the displacement when the sign bit 66 of displacement 44 takes on a second logic level, such as a logic one, to produce a second sum output 90. In this manner, the sign of displacement 44 determines whether length 50 is added to or subtracted from the sum of the current address pointer 40 and the displacement 44 in adder 82 to produce second sum output 90. Second sum output 90 is a second potential next address pointer.

An output 74 from sign detector 72 is logically combined with output 66 from sign detector 86 in exclusive OR gate 76 to provide select input 92 to multiplexer 94. Multiplexer 94 receives as first and second inputs the first and second potential next address pointers 80 and 90. When the inputs to exclusive OR gate 76 are the same logic states, multiplexer 94 selects from inputs 80 and 90 input 80, which is the first potential next address pointer, as its output 96. When the inputs to exclusive OR gate 76 are different logic states, multiplexer 94 selects from inputs 80 and 90 input 90, which is the second potential next address pointer as its output 96.

Output 96 is the modulo address pointer 40 for a subsequent memory access to circular buffer 32 and is provided as an input to address pointer register 38 where it is stored in preparation for a subsequent memory access.

One advantage of the address arithmetic unit 22 illustrated in FIG. 2 is that adders 78 and 82 operate simultaneously to calculate the first and second potential address pointers in parallel with each other and in parallel with sign detector 72 detecting the sign of the sum of its inputs. Operating in parallel reduces the amount of logic in the critical path to produce an output that is the address pointer for a subsequent iteration. The potential address pointers 80 and 90 are available simultaneously and the appropriate one of the two potential address pointers is selected based on the sign detector output 72 and 86 as combined by exclusive OR gate 76.

Figure 3:
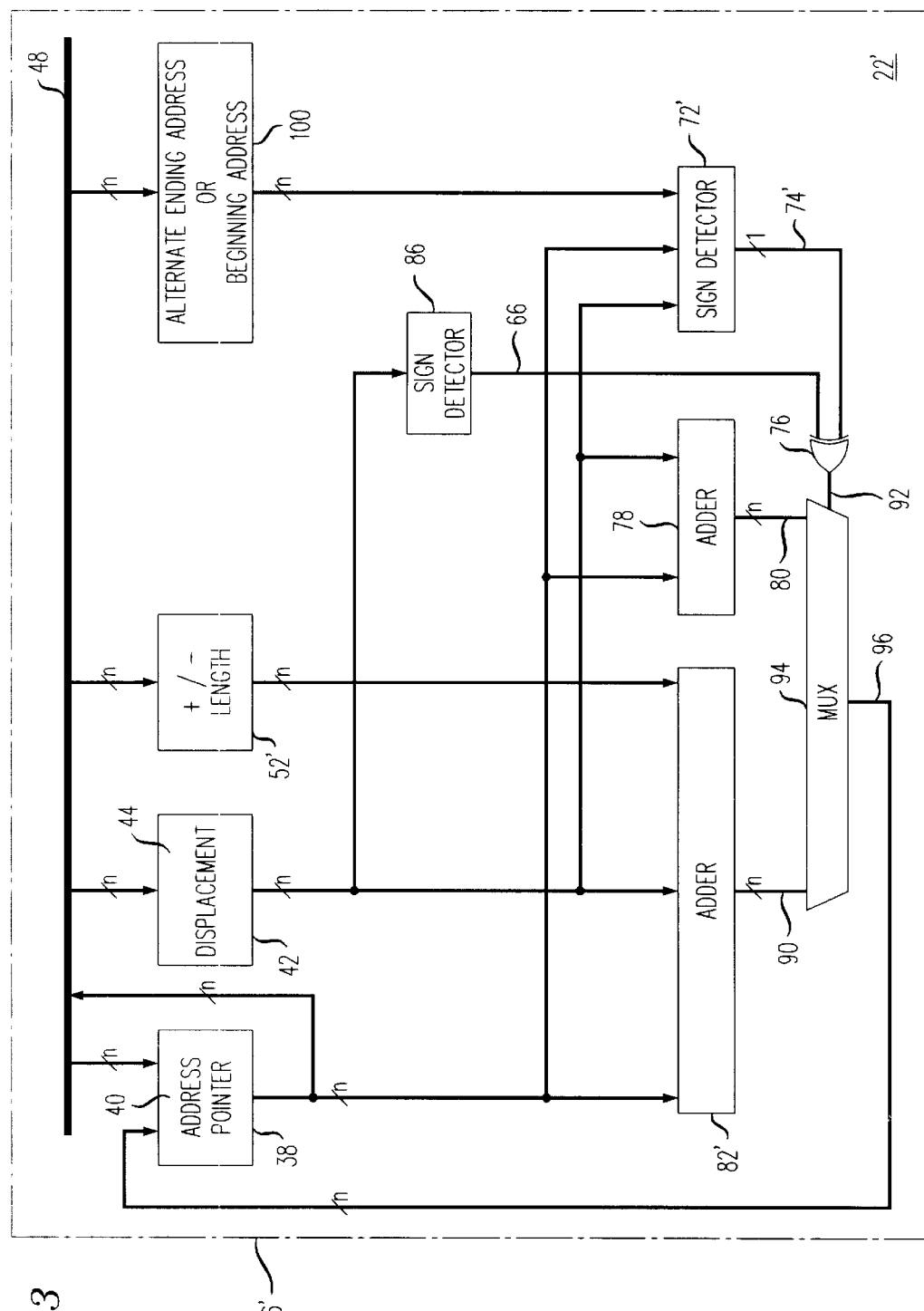
FIG. 3 is a portion of an alternative embodiment arithmetic unit.

An alternative embodiment address arithmetic unit 22' is illustrated in FIG. 3 in processor 26' in which a single register 100 stores the negative of either beginning address 30 or alternative ending address 34. When displacement 44 is positive, the negative of alternative ending address 34 is loaded into register 100 from bus 48. When displacement 44 is negative, the negative of beginning address 30 is loaded into register 100 from bus 48. Storing the negative of beginning address 30 or alternative ending address 34 obviates the need to negate beginning address 30 or alternative ending address 34 in hardware.

Length register 52' is loaded with the negative of length 50, from bus 48, when displacement 44 is positive, and is loaded with length 50, from bus 48, when displacement 44 is negative.

Adder 78 receives as a first input address pointer 40 from address pointer register 38 and receives as a second input displacement 44 from displacement register 42. Adder 78 adds the first and second inputs to produce a first sum output that is a first potential next address pointer.

Adder 82' receives as inputs address pointer 40 from address pointer register 38, displacement 44 from displacement register 42, and the contents of length register 52'. Adder 82' adds the inputs to produce a second sum output that is a second potential next address pointer 90.

Sign detector 72' receives as inputs address pointer 40 from address pointer register 38, displacement 44 from displacement register 42 and the alternate ending address or beginning address (as described above) stored in register 100. Sign detector 72' may or may not complete the addition of its inputs but provides a one-bit output 74' that is the sign of the sum of the inputs. Sign detector 72' determines whether the sum of the address pointer 40, displacement 44 and the contents of register 100 is greater than or equal to zero, or less than zero. Output 74' is logically combined with output 66 from sign detector 86 in exclusive OR gate 76 to produce select input 92 which is provided as the select input to multiplexer 94'.

Multiplexer 94 receives as first and second inputs the first and second potential next address pointers 80 and 90. When the select input 74' to multiplexer 94 takes on a first logic state, such as a logic 1, multiplexer 94 selects input 80, the first potential next address pointer, as its output 96. Multiplexer 94 selecting input 80 as output 96 indicates there has been no wraparound. When the select input 92 to multiplexer 94 takes on a second logic state, such as a logic 0, multiplexer 94 selects input 90, the second potential next address pointer, as its output 96. Multiplexer 94 selecting input 90 as output 96 indicates wraparound will occur.

Output 96 is the modulo address pointer 40 for a subsequent memory access to circular buffer 32 and is provided as an input to address pointer register 38 where it is stored in preparation for a subsequent memory access.

In the address arithmetic units 22 and 22', there is no restriction on the magnitude of the displacement or whether the displacement is an increment or a decrement. The invention may be used in pre or post increment, or pre or post decrement modulo address generation.

The invention may be fabricated using any known VLSI processes in one or more integrated circuits with particular application in microprocessors, microcontrollers or digital signal processors. The invention is particularly useful in communication systems and equipment employing integrated circuits including circular buffers. Such communication systems and equipment have the advantage of greater flexibility to accomplish signal processing.

The invention claimed is:

1. A method of generating an address pointer to access memory locations in a buffer in a modulo sequence, comprising the steps of:
   selecting between one greater than an ending address and a beginning address as a selected address;
   detecting the sign of a displacement;
   adding a present address pointer and displacement to provide a first potential next address pointer;
   combining the present address pointer, displacement and length to form a second potential next address pointer;
   detecting the sign of a sum of the present address pointer, displacement, and the selected address; and
   selecting one of the first potential next address pointer and the second potential next address pointer as a next address pointer based on the detected sign of the sum.

2. A method of generating an address pointer as recited in claim 1, wherein combining the present address pointer, displacement and length comprises:
   adding the present address pointer and displacement, and adding or subtracting the length based on a sign of the displacement.

3. A circuit including an address arithmetic unit, comprising:
   a first selector adapted to receive a first input representative of one greater than an ending address of a circular buffer, a second input representative of a beginning address of the circular buffer, and a third input indicative of the sign of a displacement for stepping through addresses of memory locations in the circular buffer, the first selector adapted to select as an output one of the first and second inputs based on a state of the third input;
   a sign detector adapted to receive as inputs an address pointer, the displacement, and the first selector output, the sign detector adapted to provide a sign detector output indicative of whether a sum of the present address pointer, the displacement and a negative of the first selector output is of a first state or a second state;
   a first adder adapted to receive as inputs the present address pointer and displacement, the first adder adapted to add the inputs to provide an output that is a first potential next address pointer;
   a second adder adapted to receive as inputs the present address pointer, the displacement including a sign of the displacement, and the length, the second adder adapted to add the inputs to provide an output that is a second potential next address pointer when the sign of the displacement is a first state, and to add the present address pointer and the displacement and subtract the length to provide an output that is a second potential next address pointer when the sign of the displacement is a second state;
   a second logic circuit for receiving the sign bit of the displacement and the sign detector output, the second logic circuit for logically combining the sign bit and sign detector output to provide a second logic circuit output; and
   a second selector adapted to receive the first potential next address pointer as a first input, the second potential next address pointer as a second input, and the second logic circuit output as a third input, the second selector adapted to select as an output one of the first and second potential next address pointers as a next address pointer based on a state of the third input.

4. The circuit as recited in claim 3, wherein at least one of said first and second selector is a multiplexer.

5. The circuit as recited in claim 3, wherein the sign detector is an adder.

6. The circuit as recited in claim 3, wherein the circuit is an integrated circuit.

7. The circuit as recited in claim 6, wherein the integrated circuit is a digital signal processor.

8. A circuit including an address arithmetic unit, comprising:
   a first adder adapted to receive as inputs a present address pointer and a displacement, the first adder adapted to add the inputs to provide an output that is a first potential address pointer;
   a second adder adapted to receive as inputs the present address pointer, the displacement, and a representation of a length, the second adder adapted to add the inputs to provide an output that is a second potential address pointer;

a sign detector adapted to receive as inputs the present address pointer, the displacement, and one of a negative representation of a beginning address and a negative representation of one greater than an ending address, the sign detector adapted to provide a sign detector output indicative of whether a sum of the inputs is of a first state or a second state; and a selector adapted to receive the first potential address pointer as a first input, the second potential address pointer as a second input, and the sign detector output as a third input, the second selector adapted to select as an output one of the first and second potential address pointers as a subsequent address pointer based on a state of the third input.

9. The circuit as recited in claim 8, wherein said selector is a multiplexer.

10. The circuit as recited in claim 8, wherein the circuit is an integrated circuit.

11. The circuit as recited in claim 10, wherein the integrated circuit is a digital signal processor.

12. The circuit as recited in claim 10, wherein the integrated circuit is a microprocessor.

* * * * *